Patented Dec. 22, 1936

2,065,394

UNITED STATES PATENT OFFICE 2,065,394

PROCESS OF MAKING FORMALDEHYDE

Elton B. Punnett, Buffalo, N. Y., assignor to National Aniline & Chemical Company, Inc., New York, N. Y., a corporation of New York No Drawing. Application August 2, 1928, Serial No. 297,090

14 Claims. (Cl. 260—138)

This invention relates to improvements in the composition of catalysts, particularly of catalysts which are capable of causing oxidation reactions, and to processes wherein such catalysts are employed, some of which improvements are broadly claimed in my United States Patent 1,978,506 issued October 30, 1934, on application Serial No. 297,089, filed concurrently herewith. It relates more specifically to improvements in the selective oxidation of methyl alcohol and has particular reference to the production of formaldehyde by the vapor phase oxidation of methyl alcohol by means of an oxygen-containing gas in the presence of a catalyst.

One of the objects of this invention is the production of formaldehyde in commercial yields by a process comprising the partial oxidation of methyl alcohol in the vapor phase mixed with a gas containing free oxygen in the presence of a catalyst, in which the quantities of methyl alcohol which pass through the process unreacted, and which are oxidized to form other products than formaldehyde, are relatively small.

Another object of the invention is the provision of a catalyst peculiarly adapted for the selective oxidation of methyl alcohol to formaldehyde.

Another object of the invention is the provision of a catalyst for the reaction which enables operation of the process at a relatively high velocity of the gas stream (low time of contact) whereby an increased production of formaldehyde is obtained per unit of catalyst volume.

Another object of the invention is the provision of a catalyst comprising vanadium oxide and a moderator therefor which enables a high production of formaldehyde to be obtained from the methyl alcohol charged to the reactor.

Another object of the invention is the increased production of formaldehyde per unit of equipment by the operation of the oxidation process under superatmospheric pressure.

Another object of the invention is the production of formaldehyde by a process operating practically continuously over comparatively long periods of time.

Another object of the invention is the provision of a distender or carrier for the catalyst which is relatively inert under the conditions of the reaction, which is relatively rigid, which is relatively infusible and substantially unaffected by adverse operating conditions, which does not dust, which causes relatively no deterioration of the catalyst, and which has a high degree of porosity and high tenacity for the catalyst.

Other objects of the invention will be apparent from a consideration of the following disclosure which is given for the purpose of illustrating the invention.

A number of processes are known for the production of formaldehyde by the catalytic oxidation of methyl alcohol in the presence of air or other oxygen-containing gas, among which may be mentioned U. S. patent to Bailey and Craver, No. 1,383,059.

This invention may be regarded as an improvement upon the process described in U. S. Patent No. 1,383,059, and is based upon the discovery that high production of formaldehyde can be obtained with low production of by-products, and with low quantities of unreacted methyl alcohol remaining, by passing methyl alcohol vapors admixed with air, or other gases containing free oxygen, under regulated conditions of temperature, speed of gas stream, etc., in contact with a mixed or composite catalyst of particular character, namely, a catalyst containing vanadium oxide in admixture or combination with one or more substances which act as a moderator for said vanadium oxide, preferably deposited upon a suitable carrier such as, for example, "Alundum", "Filtros", grained aluminum, pumice, etc.

As particular instances of the catalyst to be employed, admixtures or combinations of vanadium oxide with molybdenum oxide may be cited. For example, in the same apparatus and under substantially similar conditions of operation, except catalyst temperature, I have obtained from methyl alcohol gross yields of formaldehyde from 5 to 20 per cent, or better, in excess of those obtained by the use of vanadium oxide alone as a catalyst, depending upon the percentage of molybdenum oxide incorporated with the vanadium oxide and the conditions of operation. The catalyst temperature is varied to some extent in order to obtain the maximum efficiency of production from each catalyst. It has been found that the mixed catalysts function more effectively, so far as formaldehyde production from methyl alcohol is concerned, when the catalyst temperature is somewhat higher than that employed with vanadium oxide alone as catalyst, although the range of temperature is approximately the same.

It has furthermore been found, according to the present invention, that a still further increase in the gross yield of formaldehyde can be obtained if the catalyst (for example, a mixture of equal proportions by weight of vanadium and molybdenum oxides) is deposited or coated on fragments, pellets or chips of a porous, fused aluminum oxide material, for example, a porous "Alundum", preferably of a quality or grade used for filter-plates or blocks, pipes, and similar chemical apparatus, and particularly one containing grains of fused alumina bonded into a porous mass by a suitable ceramic material, for example, fused aluminum silicate. "Alundum" of such quality possesses a high fusion temperature, high porosity, and high rigidity, is substantially inert, and retains the catalyst coating over a large surface with a high degree of tenacity.

As a result, a contact mass is obtained having long life under conditions of continuous operation, and consequently the process can be carried out over comparatively long periods of time without interruption.

One form of "Alundum" found to be especially adaptable as a catalyst carrier consists of grains or crystals of alumina (such as, fused alumina) bonded by a suitable vitrified clay (such as, an aluminum silicate) into a porous mass which is broken into fragments, lumps, or granules, of which the alumina comprises about 80 per cent by weight of the mass, and the vitrified bond comprises about 20 per cent by weight of the mass.

In the preparation of the catalysts of the present invention, it is preferable that the component compounds be in the most minutely divided condition and in intimate contact with each other and supported upon a carrier in order to secure the maximum advantage of their use. The preparation of the catalyst can be accomplished by starting with a solution of a suitable vanadium salt, or other compound of vanadium, which on ignition leaves only the desired oxide, or by employing an aqueous suspension of the vanadium oxide or hydroxide. With this solution or suspension is mixed a solution containing a compound or compounds which on ignition will leave the desired moderator. I have found, however, that the catalytic oxides can be preferably obtained by employing a solution of a complex organic acid compound of vanadium of the type described in United States Patent No. 1,914,557 and No. 1,944,558 of A. E. Craver. According to said patents, a salt or other compound of the metal whose oxide is desired in the final product (such as, ammonium metavanadate, ammonia molybdate, vanadium pentoxide, or similar metallic compound) is mixed with an organic acid (such as, oxalic, malic, citric, or similar acid, and heated until the reaction therebetween is completed. A "metallic-organo complex" is thus produced (e. g., ammonium divanadyl oxalate, etc.), and this is dissolved in a suitable solvent, such as concentrated ammonium hydroxide. The carrier upon which the catalyst is to be deposited and/or within which it is to be impregnated is then mixed with the above described solution or suspension, and the mass is evaporated to dryness while being stirred. In preparing a catalyst containing a metallic oxide as a moderator, according to the present invention, solutions of the individual compounds are prepared as above described and are then mixed, incorporated with the carrier, and evaporated to dryness.

The catalyst is then ignited by passing a mixture of air, or air mixed with methanol vapors, over the carrier coated and/or impregnated with the above compounds while slowly raising the temperature, until the organic matter has been eliminated. The catalyzer or contact mass thus prepared is generally composed of individual lumps or fragments of carrier coated and/or impregnated with an intimate mixture of vanadium oxide and the moderator therefor in a finely divided state.

In carrying out the production of formaldehyde, a mixture of air and methyl alcohol (synthetic methanol, wood alcohol, etc.) is passed over or through the contact mass contained in a closed vessel or tube, the temperature of the catalyst preferably being maintained within the desired range by means of a cooling bath. The reaction mixture containing formaldehyde is passed through a cooler where it is preliminarily cooled, and then passed to a water-containing absorber where the formaldehyde and small amounts of the products of oxidation and of residual methyl alcohol are absorbed forming a solution of approximately 37 to 40 per cent strength.

The formaldehyde can be recovered from the solution in any well known manner, and if desired, the residual alcohol may be recovered and reused in the process; but it has been found that for the preparation of commercial solutions of formaldehyde, the small amount of residual alcohol contained in the product is approximately that required to stabilize the formaldehyde and prevent its polymerization. The formaldehyde solution directly produced by the process is therefore useful as an article of commerce without further treatment.

Thus, by a modification of the vanadium oxide catalyst heretofore proposed for use in the partial oxidation of methyl alcohol, and to some extent its carrier, I have been able to obtain a much higher gross yield of formaldehyde with an accompanying smaller percentage of other oxidation products and of unreacted methyl alcohol than had heretofore been obtained. Furthermore, the operation can be carried out at a higher reaction temperature and with a shorter time of contact than were formerly employed, and consequently the production output of a unit of apparatus used in carrying out the process is also considerably increased.

The invention will be described in connection with the following examples which are given for illustrative purposes only, it not being intended to limit the procedure to the details given since the process can be varied throughout wide limits without departing from the spirit or scope of the invention. The parts are by weight.

*Example 1.*—A mixture of approximately 12 parts of air and 1 part of methyl alcohol is passed over or through a contact mass consisting of about 70 parts of vanadium oxide and 30 parts of molybdenum oxide coated on particles of so-called "grained" aluminum of a size that will be passed by a 4 but retained by an 8 mesh screen, the temperature being held at about 320 to 325° C., the pressure being sufficient to force the gases through the apparatus under atmospheric pressure, and the time of contact being approximately 0.13 second. The catalyst is preferably contained in tubes or other confined spaces which are immersed in a temperature regulating bath. The exit gases containing the products of the reaction are cooled to about 40° C. and the soluble products are absorbed in water. The condensate formed on cooling is added to the absorber. Of 100 parts of methyl alcohol charged to the reactor, about 74 to 75 parts are converted to formaldehyde. If, in this example, there is employed a catalyst composed of about 80 per cent of vanadium oxide and about 20 per cent of potassium sulfate at a slightly higher temperature, comparable results may be obtained.

Example 2.—A mixture of approximately 13 parts of air and 1 part of methyl alcohol is passed over or through a contact mass consisting of a mixture of about 60 parts of vanadium oxide and 40 parts of molybdenum oxide, deposited upon an "Alundum" carrier, the temperature being maintained at approximately 335° to 355° C., the pressure being approximately atmospheric, and the time of contact being about 0.11 second. The "Alundum" used as carrier for the catalyst of this example can be obtained by breaking and screening pieces of Grade RA98 "Alundum" molded material of the Norton Company of Worcester, Mass. This is a highly porous fused aluminum oxide material used for filter-blocks, pipes, etc., and contains about 80 per cent of aluminum oxide and about 20 per cent of aluminum silicate, the aluminum oxide being in the form of minute, fused crystals or grains bonded into a porous mass by vitrified aluminum silicate, and the aluminum silicate having a composition corresponding to about equal weights of alumina and silica. The fragments of "Alundum" employed are preferably of a size that will be passed by a 4 and retained by an 8 mesh screen. Approximately 76 parts of formaldehyde are obtained for every 100 parts of methyl alcohol charged to the convertor, or about 81 parts of every 100 parts of methyl alcohol charged to the reactor, are converted to formaldehyde. The net yield of formaldehyde calculated on the basis of the methyl alcohol actually consumed in the process is over 90 per cent.

Example 3.—A mixture of approximately 13 parts of air and 1 part of methyl alcohol and containing about ⅓ of a part of water in the form of steam is passed over or through a contact mass consisting of a mixture of approximately equal parts of vanadium and molybdenum oxides deposited upon and in intimate contact with "Alundum" fragments such as are described in the preceding example, the temperature being maintained at about 390° to 415° C., the pressure being approximately atmospheric, and the time of contact between the gas mixture and the catalyst being maintained at about 0.10 second. Over 85 parts of each 100 parts of methyl alcohol charged are converted to formaldehyde, approximately 6 parts being burned up or converted to other products, and the residue being unreacted methyl alcohol. The net yield of formaldehyde is about 93.5 per cent of that theoretically obtainable.

It will furthermore be noted that in the process of the above examples the proportions of methyl alcohol converted to formic and other similar acids are generally very small, usually varying from about 0.2 to 0.5 of one per cent.

Various types of apparatus may be used in carrying out the process; for example, the contact masses may be placed upon shelves or trays, or in tubes. A form of apparatus found to be well adapted to the process, however, is one in which the catalyst is contained in vertical tubes immersed in a liquid temperature regulating bath, such as is shown, for example, in U. S. Patent No. 1,604,739; but it is to be understood that the invention is not restricted to any particular form of apparatus.

It is also to be understood that the invention is not limited to the above examples, and that the various proportions and conditions cited are all capable of wide variation. Instead of the "Alundum" carrier above described, other catalyst carriers may be used, and especially relatively inert, porous, relatively infusible, rigid materials which tenaciously retain the catalyst and do not cause appreciable deterioration thereof; and the fragments or pieces may be of a size varying from about 2 to 20 mesh, although 4 to 8 mesh is preferred. The proportions of the carrier to the catalyst may vary from about 3 to 15 parts by weight of the carrier to 1 part by weight of the catalytic mixture.

The catalyst may be composed of varying mixtures of vanadium oxide and moderator, proportions of from about 75 to 35 parts by weight of vanadium oxide and from 25 to 65 parts by weight of molybdenum oxide, more specifically proportions of less than 70 per cent to about 40 per cent of vanadium oxide and more than 30 per cent to about 60 per cent of molybdenum oxide, and still more particularly proportions of from about 60 to about 50 per cent of vanadium oxide and about 40 per cent to about 50 per cent of molybdenum oxide being cited by way of example. A contact mass composed of approximately equal parts by weight of vanadium and molybdenum oxides impregnated within, and coated upon, fragments of "Alundum", such as above described, is preferred, however, since it permits a satisfactory gross yield of formaldehyde to be obtained under commercially desirable conditions. It will be understood, however, that the invention is not limited to the use of molybdenum oxide as a moderator for the vanadium oxide catalyst; but that other moderators may be used, such as, for example, suitable metallic oxides of the metals of the fifth and sixth groups of the periodic system standing between vanadium and molybdenum (e. g., columbium, chromium, tantalum), suitable salts of the alkali metals and the alkali-earth metals (e. g. the sulfates and phosphates of the alkali metals and alkali-earth metals), etc. The oxidation of methyl alcohol to formaldehyde may be considered, for the purposes of this invention, as an intermediate stage in the complete combustion of the methyl alcohol to carbon dioxide and water; an increase in the production of formaldehyde with a corresponding decrease in the complete combustion of the alcohol may, accordingly, be considered to be a moderation of the oxidation reaction. The term "moderator" is thus used in this specification as referring to a substance which, when used with an oxidation catalyst in the vapor phase catalytic partial oxidation of methyl alcohol, decreases the complete combustion of the alcohol, or increases the production of formaldehyde, or both.

In the preparation of the catalyst, various methods may be used in addition to those above set out. For example, a solution of ammonium vanadate may be mixed with the carrier, the mixture may then be mixed with a solution of the moderator, and the mixture evaporated to dryness; but the method comprising mixing solutions of two or more substances which will produce the desired catalytic mixture on ignition, incorporating the mixture with the carrier, and evaporating to dryness is preferred. If a salt such as potassium sulfate is used as a moderator, this may be incorporated into the catalyst, preferably prior to the evaporation operation, either as the salt itself or as a solution thereof. The proportion of potassium sulfate used as moderator may vary from about 15 to 30 parts by weight when used in conjunction with about 85 to 70 parts of vanadium oxide.

The ratio of air to methyl alcohol employed in the oxidation operation can be varied within wide limits; for example, from 4 to 30, preferably from about 11 to 15, parts by weight of air to one part of methyl alcohol may be employed. Instead of air, oxygen, ozone, other oxygen-containing gas mixtures, or mixtures thereof may be used. The addition to the reaction mixture of water, preferably in the form of steam, in excess of that normally present in the alcohol and air aids in the control of the reaction temperature and reduces polymerization during the condensation and absorption operation. It is, therefore, preferably included in the process; but such addition of water is not essential. The temperature of the reaction may be varied from about 275° C. to about 475° C., temperatures of approximately 385° to 425° C. being preferred; and the time of contact between the reaction mixture and the catalyst or contact mass can also be varied from 0.07 to 1.0 second, 0.10 to 0.15 second being preferred. The temperature and time of contact as well as pressure are interrelated; a higher temperature usually being employed with a higher rate of speed of the gas stream. These latter conditions are also dependent upon the activity of the catalyst, the temperature usually being lower with a more active catalyst. Pressures at, above, and below atmospheric pressure may be used; but a superatmospheric pressure of about 2 to 30 or 40 pounds, and preferably 15 to 20 pounds, per square inch is especially desirable, since operation under such superatmospheric pressure increases the productive capacity of the catalytic apparatus, i. e., the production of formaldehyde per unit of catalytic apparatus.

The formaldehyde obtained may be recovered in any well known manner, absorption in water being preferred. Any desired type of absorption apparatus may be employed; for example, a tower or other vessel filled with packing rings or other inert surface-giving packing material; or a vessel containing bubbler plates, baffles, or the like; or a number of such absorbers in series. The water may be circulated through the absorber countercurrent to the gas stream, or otherwise, so as to act as a washer or scrubber for said stream, or the gas may be bubbled through a stationary body of absorbing liquid. Furthermore, the absorption may be made continuous or semi-continuous; e. g., by properly adjusting the rate of flow of the circulated absorption liquid (if the circulating type of absorber is used) so that a saturated solution of formaldehyde will be continuously formed and removed; or by removing the liquid when it becomes saturated and replacing it with a fresh liquid; or (if a series of stationary batches of absorbing liquid is used) by discharging the vessel containing the saturated formaldehyde solution and filling it with partially saturated liquid from one of the other vessels which is itself then charged with fresh water. Cooling of the gas stream as it leaves the reactor and prior to the absorption is not essential, but it is preferred since it enables operation of the absorber under more economical conditions. The temperature to which the gases are cooled before absorption may vary widely depending upon the extent of cooling desired, the lower the temperature the greater the efficiency of the absorber within limits; the temperature of about 40° C., above given, being merely by way of example.

I claim:

1. In the process of producing formaldehyde by the catalytic oxidation of methyl alcohol, the improvement which comprises oxidizing the methyl alcohol in the vapor phase in contact with a porous contact mass comprising a relatively inert, relatively infusible, rigid, porous carrier impregnated and coated with a mixture of vanadium oxide and an oxide of another metal included within the fifth and sixth groups of the periodic system.

2. In the process of producing formaldehyde by the catalytic oxidation of methyl alcohol, the improvement which comprises oxidizing the methyl alcohol in the vapor phase in contact with a porous contact mass comprising a porous carrier which is relatively infusible, is rigid, and contains fused aluminum oxide, impregnated and coated with a mixture containing between 75 and 35 per cent of vanadium oxide and between 25 and 65 per cent of an oxide of another metal included within the fifth and sixth groups of the periodic system.

3. In the process of producing formaldehyde by the catalytic oxidation of methyl alcohol, the improvement which comprises oxidizing the methyl alcohol in the vapor phase in contact with a porous contact mass comprising a porous "Alundun" carrier impregnated and coated with a mixture of vanadium oxide and an oxide of a metal included within the fifth and sixth groups of the periodic system and standing between columbium and molybdenum, inclusive.

4. In the process of producing formaldehyde by the catalytic oxidation of methyl alcohol, the improvement which comprises passing vapors of methyl alcohol and a gas containing free oxygen in contact with a catalyst comprising a mixture containing between about 60 and 50 per cent of vanadium oxide and between about 40 and 50 per cent of molybdenum oxide.

5. In the process of producing formaldehyde by the catalytic oxidation of methyl alcohol, the improvement which comprises passing vapors of methyl alcohol and air in contact with a catalyst comprising a mixture containing between 75 and 35 per cent of vanadium oxide and between 25 and 65 per cent of molybdenum oxide deposited upon and in intimate contact with a carrier which is relatively infusible, is rigid and highly porous, and which contains fused aluminum oxide.

6. In the process of producing formaldehyde by the catalytic oxidation of methyl alcohol, the improvement which comprises passing vapors of methyl alcohol and air in contact with a catalyst comprising a mixture containing between about 60 and 50 per cent of vanadium oxide and between about 40 and 50 per cent of molybdenum oxide deposited upon and in intimate contact with a porous "Alundun" carrier.

7. In the process of producing formaldehyde by the catalytic oxidation of methyl alcohol, the improvement which comprises passing vapors of methyl alcohol and air in contact with a catalyst comprising a mixture containing between about 60 and 50 per cent of vanadium oxide and between about 40 and 50 per cent of molybdenum oxide deposited upon and in intimate contact with a porous "Alundum" carrier maintained at a temperature of about 275° C. to 475° C., the time of contact between the gas mixture and the catalyst being about 0.10 to 0.15 second.

8. In the process of producing formaldehyde by the catalytic oxidation of methyl alcohol, the improvement which comprises passing a mixture containing 1 part by weight of methyl alcohol vapor and about 11 to 15 parts by weight of air in contact with a mixture containing between about 60 and 50 per cent of vanadium oxide and between about 40 and 50 per cent of molybdenum oxide, as a catalyst, at a temperature of about 385° C. to 425° C. and at a superatmospheric pressure of about 15 to 20 pounds per square inch.

9. In the process of producing formaldehyde by the catalytic oxidation of methyl alcohol, the improvement which comprises passing a mixture containing 1 part by weight of methyl alcohol vapor and about 11 to 15 parts by weight of air in contact with a mixture containing between about 60 and 50 per cent of vanadium oxide and between about 40 and 50 per cent of molybdenum oxide, as a catalyst, deposited upon and in intimate contact with a porous "Alundum" containing fused aluminum oxide and aluminum silicate in its composition, as a carrier, at a temperature of about 385° C. to 425° C. and at a superatmospheric pressure of about 15 to 20 pounds per square inch, the time of contact between the gas mixture and the catalyst being about 0.10 to 0.15 second.

10. In the process of producing formaldehyde by the catalytic oxidation of methyl alcohol, the improvement which comprises passing a mixture containing 1 part by weight of methyl alcohol vapor, about one-third of a part by weight of water vapor, and about 11 to 15 parts by weight of air in contact with a mixture containing between about 60 and 50 per cent of vanadium oxide and between about 40 and 50 per cent of molybdenum oxide, as a catalyst, deposited upon and impregnated in fragments of a porous "Alundum" 2 to 20 mesh in size and containing fused aluminum oxide and aluminum silicate in its composition, as a carrier, at a temperature of about 385° C. to 425° C. and at a superatmospheric pressure of about 15 to 20 pounds per square inch, the time of contact between the gas mixture and the catalyst being about 0.1 to 0.15 second.

11. In the process of producing formaldehyde by the catalytic oxidation of methyl alcohol, the improvement which comprises passing vapors of methyl alcohol and air into contact with a catalyst consisting of a mixture of vanadium oxide and molybdenum oxide in which the vanadium oxide constitutes not more than 70% and the molybdenum oxide not less than 30% of the mixture.

12. In the process of producing formaldehyde by the catalytic oxidation of methyl alcohol, the improvement which comprises passing vapors of methyl alcohol and air into contact with a catalyst consisting of a mixture of vanadium oxide and molybdenum oxide in which the vanadium oxide constitutes not more than 70% or less than 50% of the mixture.

13. In the process of producing formaldehyde by the catalytic oxidation of methyl alcohol, the improvement which comprises passing vapors of methyl alcohol and air into contact with a catalyst consisting of a mixture of vanadium oxide and oxide of a metal included within the fifth and sixth groups of the periodic system and standing between columbium and molybdenum inclusive, in which the vanadium oxide constitutes not more than 70% or less than 50% of the mixture.

14. In the process of producing formaldehyde by the catalytic oxidation of methyl alcohol, the improvement which comprises passing vapors of methyl alcohol and a gas containing free oxygen into contact with a catalyst consisting of a mixture of vanadium oxide and an oxide of another metal included within the fifth and sixth groups of the periodic system, in which the vanadium oxide constitutes not more than 70% and the oxide of the other metal not less than 30% of the mixture.

ELTON B. PUNNETT.